(12) United States Patent
Falke et al.

(45) Date of Patent: Nov. 23, 2010
(10) Patent No.: US 7,837,211 B2

(54) HEAD TUBE ASSEMBLY FOR A BICYCLE

(75) Inventors: Jürgen Falke, Ludwigsburg (DE); Jason Lai, Changhua Hsien (TW)

(73) Assignee: Merida Industry Co., Ltd., Tatsun Hsiang, Changhua Hsien (TW)

( * ) Notice: Subject to any disclaimer, the term of this patent is extended or adjusted under 35 U.S.C. 154(b) by 82 days.

(21) Appl. No.: 12/405,105

(22) Filed: Mar. 16, 2009

(65) Prior Publication Data
US 2010/0230928 A1 Sep. 16, 2010

(51) Int. Cl.
*B62K 21/06* (2006.01)
(52) U.S. Cl. ...................................................... 280/280
(58) Field of Classification Search .................. 280/279, 280/280
See application file for complete search history.

(56) References Cited
U.S. PATENT DOCUMENTS
4,410,197 A 10/1983 St. Hillaire
7,503,575 B2 * 3/2009 Kurokawa et al. .......... 280/279

FOREIGN PATENT DOCUMENTS
| | | |
|---|---|---|
| DE | 9213135 U1 | 2/1994 |
| DE | 20205643 U1 | 7/2002 |
| JP | 63004887 U | 1/1988 |
| JP | 11263268 A | 9/1999 |

* cited by examiner

*Primary Examiner*—Kevin Hurley
(74) *Attorney, Agent, or Firm*—patenttm.us

(57) ABSTRACT

A head tube assembly for a bicycle has a frame, a lower tube, an upper tube and a cover. The lower tube is mounted in the front end of the frame and has a top, a bottom and a lower bearing mounted in the bottom of the lower tube. The upper tube has a top, a bottom detachably connected to the top of the lower tube and an upper bearing mounted in the top of the upper tube. The cover is detachably mounted on the top at the front end of the frame and has a through hole mounted around the top of the upper tube.

8 Claims, 4 Drawing Sheets

HEAD TUBE ASSEMBLY FOR A BICYCLE

BACKGROUND OF THE INVENTION

1. Field of the Invention

The present invention relates to a head tube assembly, and more particularly to a head tube assembly for a bicycle.

2. Description of Related Art

Bicycles are widely used in sports and races, but different kinds of races need different kinds of bicycle designs. For example, a bicycle for Ironman Triathlon needs a handle bar at a relative high position on a bicycle frame, but a bicycle for a road racing needs a handle bar at a relative low position on a bicycle frame. However, a conventional bicycle does not have an adjustable head tube for positioning a handle bar at different heights, so a user has to prepare different kinds of bicycles for different conditions. This will increase the cost for using different kinds of bicycles, and to transport and to store the bicycle are inconvenient.

To overcome the shortcomings, the present invention tends to provide a head tube assembly for a bicycle to mitigate or obviate the aforementioned problems.

SUMMARY OF THE INVENTION

The main objective of the invention is to provide a head tube assembly for a bicycle and that is versatile in use. The head tube assembly has a frame, a lower tube, an upper tube and a cover. The lower tube is mounted in the front end of the frame and has a top, a bottom and a lower bearing mounted in the bottom of the lower tube. The upper tube has a top, a bottom detachably connected to the top of the lower tube and an upper bearing mounted in the top of the upper tube. The cover is detachably mounted on the top at the front end of the frame and has a through hole mounted around the top of the upper tube.

Other objects, advantages and novel features of the invention will become more apparent from the following detailed description when taken in conjunction with the accompanying drawings.

DETAILED DESCRIPTION OF PREFERRED EMBODIMENT

Figure 1:
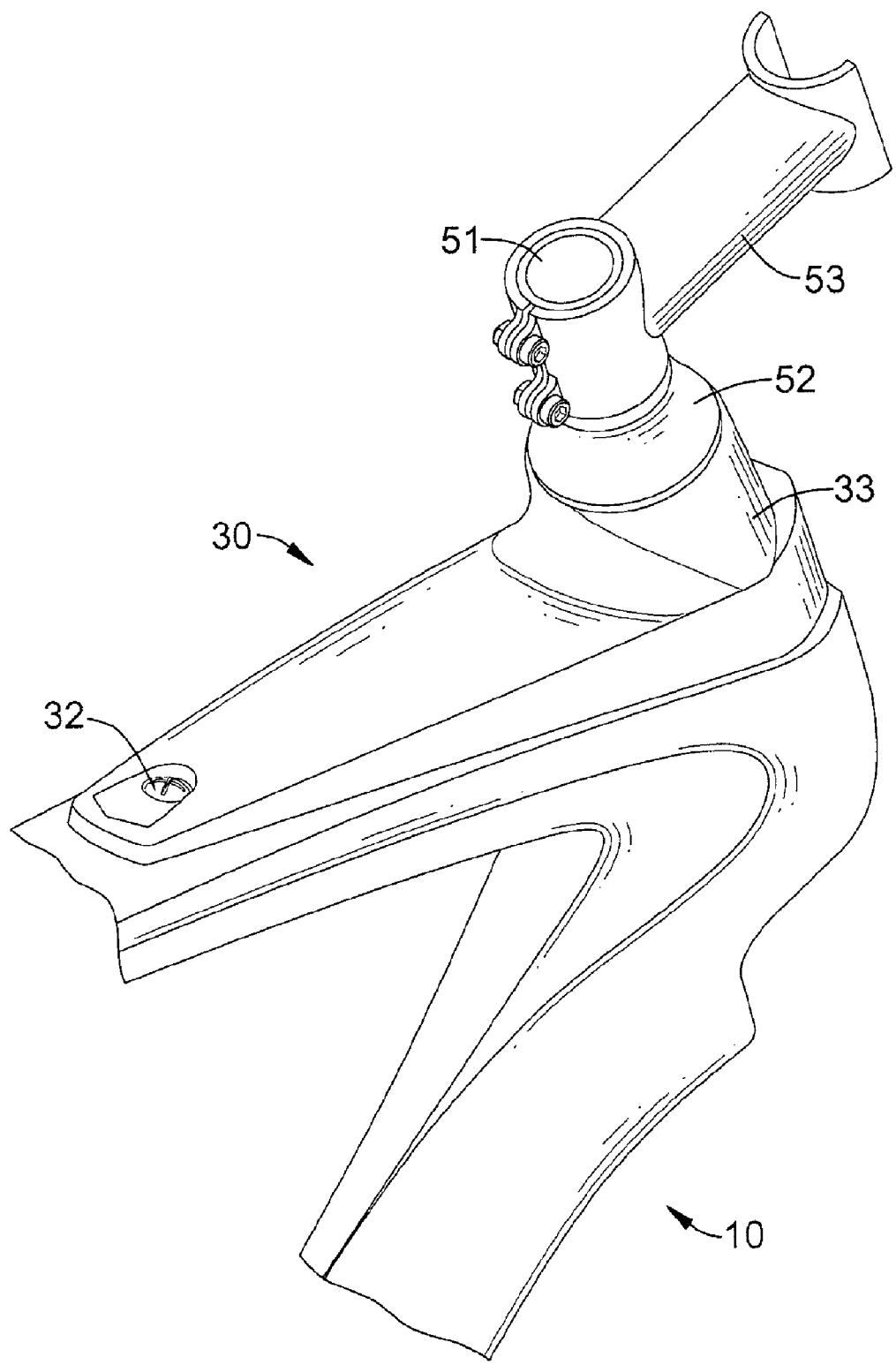
FIG. 1 is a perspective view of a head tube assembly in accordance with the present invention combined with a front fork.
Figure 2:
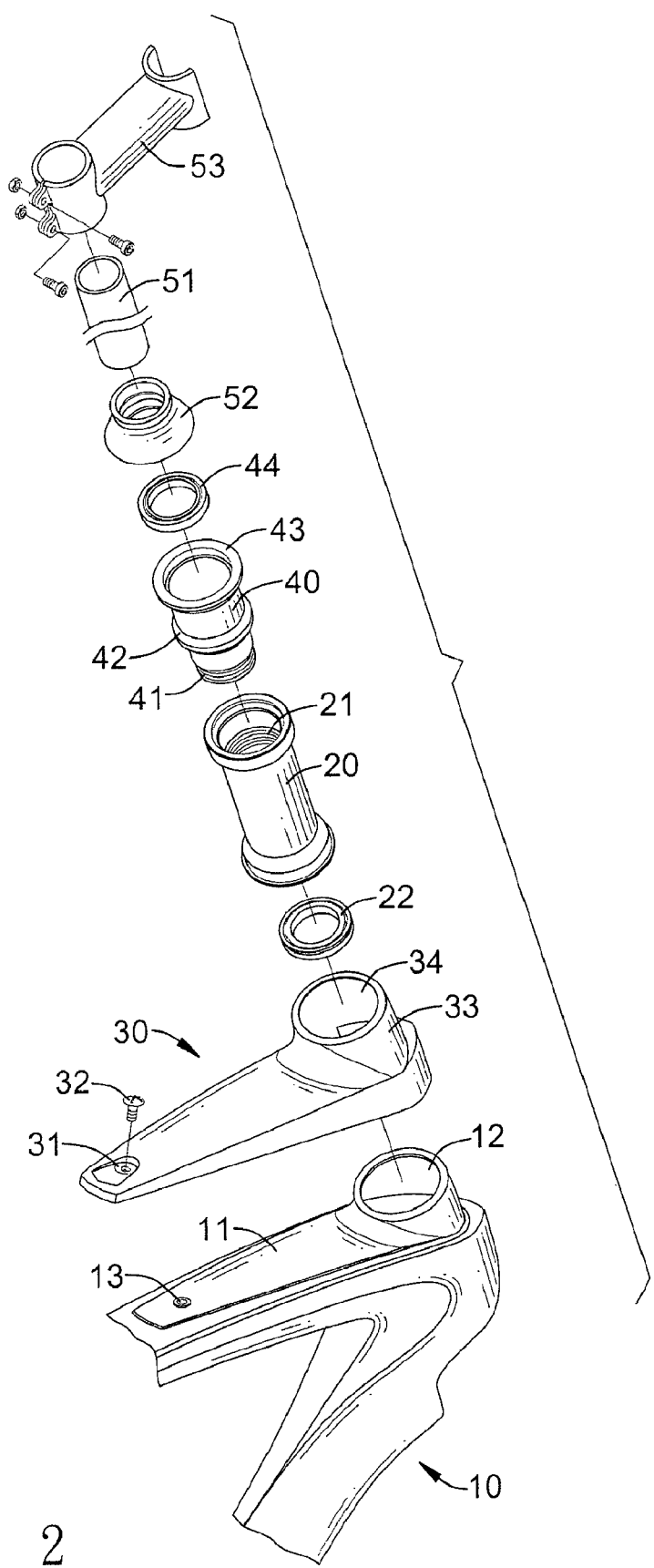
FIG. 2 is an exploded perspective view of the head tube assembly with the front fork in FIG. 1.
Figure 3:
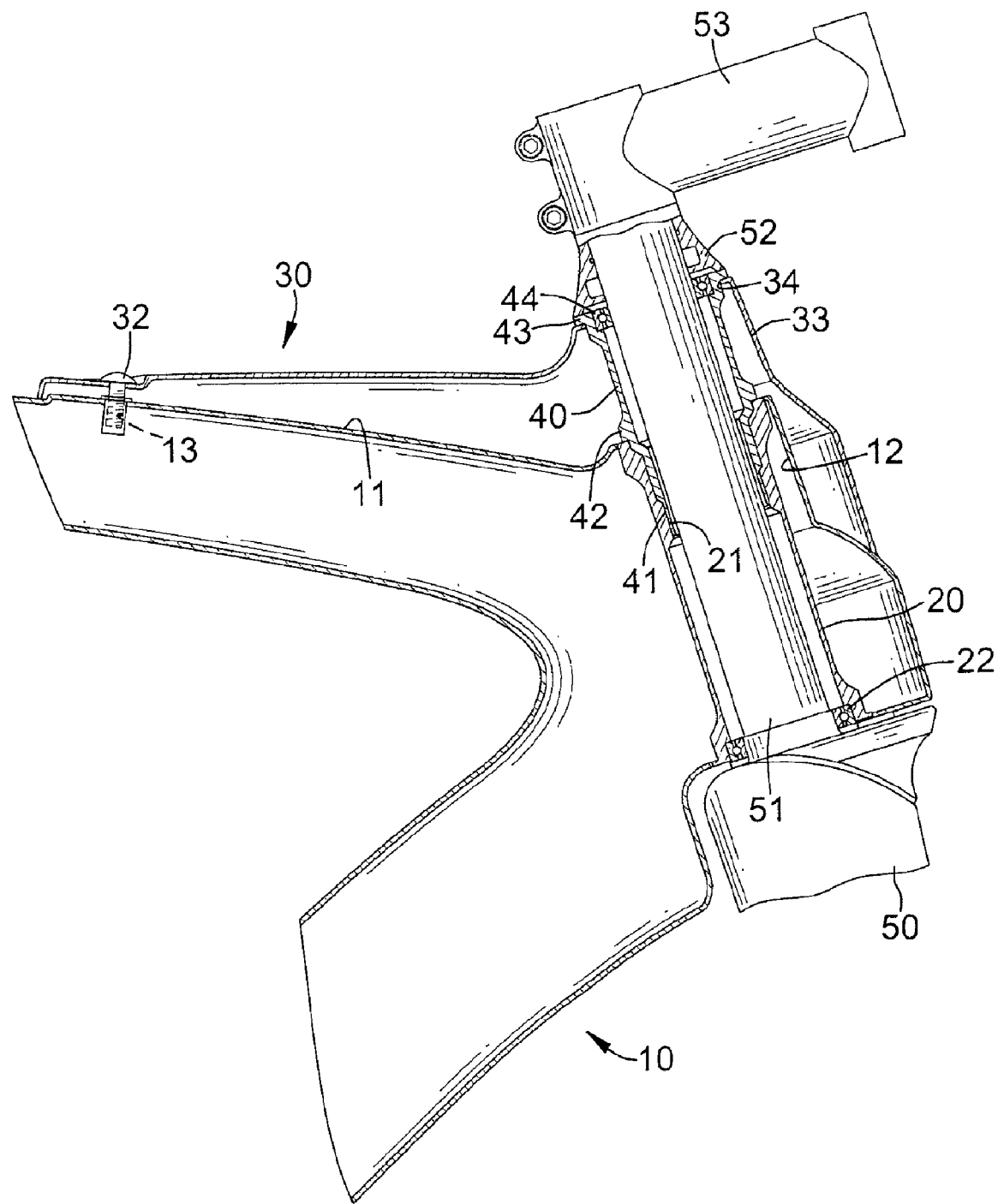
FIG. 3 is a side view in partial section of the head tube assembly with the front fork in FIG. 1.

With reference to FIGS. 1 to 3, a head tube assembly for a bicycle in accordance with the present invention comprises a frame (10), a lower tube (20), an upper tube (40) and a cover (30).

The frame (10) has a front end, a top, an elongated protrusion (11) and a connecting tube (12). The elongated protrusion (11) is formed on the top at the front end of the frame (10) and has a front end corresponding to the front end of the frame (10), a rear end and a threaded hole (13). The threaded hole (13) is defined in the rear end of the protrusion (11). The connecting tube (12) is formed on and protrudes from the front end of the protrusion (11) to define an opening at the front end of the frame (10).

The lower tube (20) is mounted in the front end of the frame (10) and extends into the front end of the frame (10) via the opening defined at the connecting tube (12). The lower tube (20) has a top, a bottom, an inner surface, an inner thread (21) and a lower bearing (22). The inner thread (21) is formed in the inner surface near the top of the lower tube (20). The lower bearing (22) is mounted in the bottom of the lower tube (20).

The upper tube (40) is detachably connected to the top of the lower tube (20) and has a top, a bottom, an upper bearing (44), an abutting flange (42) and a positioning flange (43). The bottom of the upper tube (40) is detachably connected to and inserted into the top of the lower tube (20) and has an outer thread (41) formed on the bottom of the upper tube (40) and engaging the inner thread (21) on the lower tube (20). In alternative embodiments, the upper tube (40) can be connected detachably with the lower tube (20) by a C-shaped fastener, a collar, a bolt-nut assembly or any possible manners. The upper bearing (44) is mounted in the top of the upper tube (40). The abutting flange (42) is formed around the upper tube (40) and abuts against the top of the lower tube (20). The positioning flange (43) is formed around the top of the upper tube (40) and is spaced from the abutting flange (42).

The cover (30) is detachably mounted on the top at the front end of the frame (10) and has a mounting tube (33) and a connecting hole (31). The mounting tube (33) is formed on and protrudes from the cover (30), is mounted around the connecting tube (12) on the protrusion (11) and has a through hole (34). The through hole (34) is defined through the top of the mounting tube (33), is mounted around the top of the upper tube (40) and engages the positioning flange (43) on the upper tube (40). The connecting hole (31) defined through the cover (30) and aligns with the threaded hole (13) in the protrusion (11). A bolt (32) is mounted through the connecting hole (31) in the cover (30) and is screwed into the threaded hole (13) in the protrusion (11) to attach the cover (30) onto the top of the frame (10).

To combine a front fork (50) of a bicycle with the head tube assembly, a stem (51) of the front fork (50) is inserted into the lower tube (20) and the upper tube (40) and protrudes out from the top of the upper tube (40). The lower bearing (22) and the upper bearing (44) are mount around the stem (51), so the front fork (50) can be rotated freely relative to the frame (10). A cap (52) is mounted around the top of the stem (51) protruding out from the upper tube (40), and a grip (53) combined with a handle bar is connected with the top of the stem (51). Accordingly, a bicycle rider can steer the bicycle by rotating the front fork (50) relative to the frame (10).

With such an arrangement, the handle bar can be positioned at a relative high position relative to the frame (10) if an upper tube (40) with a predetermined length is used. Therefore, a bicycle with a higher handle bar can be used for Ironman Triathlon or the like.

Figure 4:
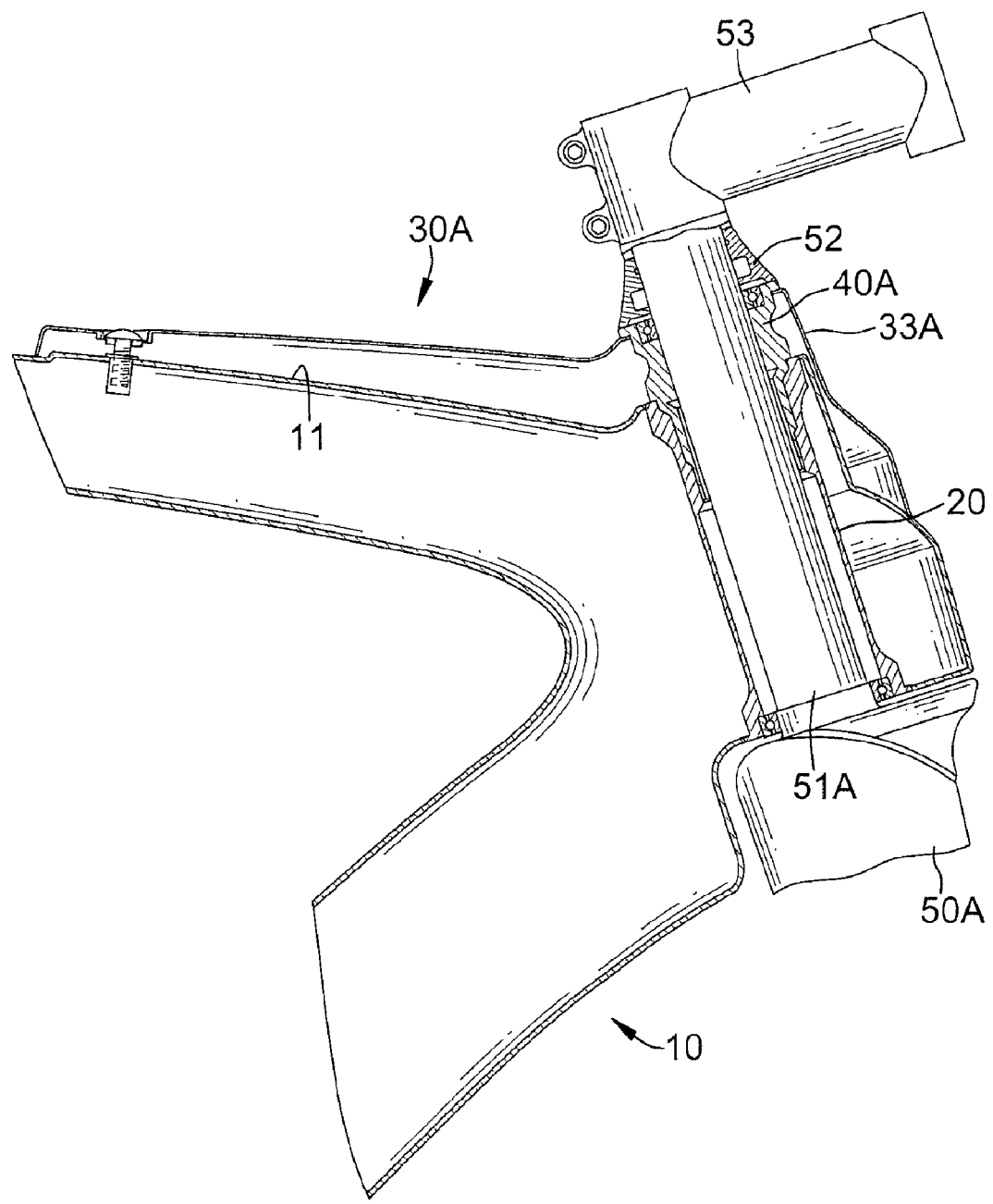
FIG. 4 is a side view in partial section of an alternative embodiment of a head tube assembly in accordance with the present invention combined with another front fork, wherein a short upper tube is used.

In an alternative operation embodiment, with reference to FIG. 4, the grip (53) with a handle bar can be located at a relative low position relative to the frame (10) when a shorter upper tube (40A) and a corresponding cover (30A) are used after a longer upper tube (40) and the corresponding cover (30) being removed. Wherein, a short mounting tube (33A) is mounted on the cover (30A) to fit with the short upper tube (40A). The shorter upper tube (40A) may also be fitted with a front fork (50A) with a short stem (51A) to make the head tube assembly being versatile in use. With such an arrangement, a bicycle with a lower handle bar can be used for a road racing or the like.

Because the head tube assembly comprises two detachably combined upper tube (40,40A) and lower tube (20), the height of a handle bar is adjustable by changing different upper tubes (40,40A) in different lengths. Therefore, the head tube assembly can fit with different needs easily and conveniently at a lowered cost, and to prepare different types of bicycles for different conditions are unnecessary.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A head tube assembly for a bicycle comprising:
   a frame having a front end and a top;
   a lower tube mounted in the front end of the frame and having a top, a bottom and a lower bearing mounted in the bottom of the lower tube;
   an upper tube having a top, a bottom detachably connected to the top of the lower tube and an upper bearing mounted in the top of the upper tube; and
   a cover detachably mounted on the top at the front end of the frame and having a through hole mounted around the top of the upper tube.

2. The head tube assembly as claimed in claim 1, wherein the lower tube has an inner thread formed in an inner surface near the top of the lower tube; and
   the upper tube has an outer thread formed on the bottom of the upper tube and engaging the inner thread on the lower tube.

3. The head tube assembly as claimed in claim 2, wherein the upper tube further has
   an abutting flange formed around the upper tube and abutting against the top of the lower tube; and
   a positioning flange formed around the top of the upper tube, spaced from the abutting flange and engaging the through hole in the cover.

4. The head tube assembly as claimed in claim 3, wherein the frame further has
   an elongated protrusion formed on the top at the front end of the frame and having a front end corresponding to the front end of the frame and a rear end securely connected to the cover; and
   a connecting tube formed on and protruding from the front end of the protrusion, wherein the lower tube extends into the front end of the frame via the connecting tube.

5. The head tube assembly as claimed in claim 4, wherein the protrusion further has a threaded hole defined in the rear end of the protrusion;
   the cover further has
      a connecting hole defined through the cover and aligning with the threaded hole in the protrusion; and
      a mounting tube formed on and protruding from the cover and mounted around the connecting tube on the protrusion; and
   a bolt is mounted through the connecting hole in the cover and is screwed into the threaded hole in the protrusion to attach the cover onto the top of the frame.

6. The head tube assembly as claimed in claim 1, wherein the upper tube further has
   an abutting flange formed around the upper tube and abutting against the top of the lower tube; and
   a positioning flange formed around the top of the upper tube, spaced from the abutting flange and engaging through hole in the cover.

7. The head tube assembly as claimed in claim 1, wherein the frame further has
   an elongated protrusion formed on the top at the front end of the frame and having a front end corresponding to the front end of the frame and a rear end securely connected to the cover; and
   a connecting tube formed on and protruding from the front end of the protrusion, wherein the lower tube extends into the front end of the frame via the connecting tube.

8. The head tube assembly as claimed in claim 7, wherein the protrusion further has a threaded hole defined in the rear end of the protrusion;
   the cover further has
      a connecting hole defined through the cover and aligning with the threaded hole in the protrusion; and
      a mounting tube formed on and protruding from the cover and mounted around the connecting tube on the protrusion; and
   a bolt is mounted through the connecting hole in the cover and is screwed into the threaded hole in the protrusion to attach the cover onto the top of the frame.

* * * * *